United States Patent
Zhou et al.

(10) Patent No.: US 10,313,074 B1
(45) Date of Patent: Jun. 4, 2019

(54) CHANNEL CONDITION ESTIMATION USING STATIC USER DATA SYMBOLS OVER USER EQUIPMENT (UE) SPECIFIC REFERENCE SIGNALS

(71) Applicant: Sprint Communications Company L.P., Overland Park, KS (US)

(72) Inventors: Yu Zhou, Herndon, VA (US); Muhammad Ahsan Naim, Sterling, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 198 days.

(21) Appl. No.: 15/251,187

(22) Filed: Aug. 30, 2016

(51) Int. Cl.
*H04W 4/00* (2018.01)
*H04L 5/00* (2006.01)
*H04L 27/26* (2006.01)

(52) U.S. Cl.
CPC .......... *H04L 5/0048* (2013.01); *H04L 5/0057* (2013.01); *H04L 27/2601* (2013.01)

(58) Field of Classification Search
CPC .. H04L 5/0048; H04L 5/0057; H04L 27/2601
See application file for complete search history.

(56) References Cited

U.S. PATENT DOCUMENTS

| | | | |
|---|---|---|---|
| 7,808,882 B2 | 10/2010 | Imamura | |
| 8,310,988 B2 | 11/2012 | Ryu et al. | |
| 8,411,556 B2 | 4/2013 | Imamura | |
| 8,537,911 B2 | 9/2013 | Sayana et al. | |
| 8,837,452 B2 | 9/2014 | Yoon et al. | |
| 8,873,472 B2 | 10/2014 | Kang et al. | |
| 8,879,672 B2 | 11/2014 | Jung et al. | |
| 9,374,716 B2 * | 6/2016 | Enescu | H04W 24/02 |
| 9,374,719 B2 | 6/2016 | Xu et al. | |
| 2009/0046631 A1 * | 2/2009 | Meylan | H04W 80/02 370/328 |
| 2009/0092138 A1 * | 4/2009 | Joo | H04W 28/065 370/392 |
| 2009/0163211 A1 * | 6/2009 | Kitazoe | H04W 74/004 455/436 |
| 2010/0290400 A1 * | 11/2010 | Lee | H04L 1/1825 370/328 |
| 2011/0103317 A1 * | 5/2011 | Ribeiro | H04W 28/16 370/329 |
| 2011/0211467 A1 * | 9/2011 | Bhat | H04B 7/15542 370/252 |

(Continued)

*Primary Examiner* — Stephen M D Agosta (57) ABSTRACT

A wireless communication transmitter converts the user data into static user data symbols and dynamic user data symbols. The wireless communication transmitter wirelessly transmits the dynamic user data symbols over user data resource elements and wirelessly transmits the static user data symbols over reference signal resource elements. A wireless communication receiver wirelessly receives the dynamic user data symbols over the user data resource elements and wirelessly receives the static user data symbols over the reference signal resource elements. The wireless communication receiver determines a wireless channel status condition based on the static user data symbols received over the reference signal resource elements. The wireless communication receiver generates a user data block including the user data from the dynamic user data symbols and the static user data symbols.

14 Claims, 5 Drawing Sheets

(56) References Cited

U.S. PATENT DOCUMENTS

| | | | |
|---|---|---|---|
| 2012/0155307 A1* | 6/2012 | Turk | H04W 24/08 370/252 |
| 2013/0182799 A1* | 7/2013 | Geirhofer | H04W 56/00 375/340 |
| 2014/0092760 A1 | 4/2014 | Geirhofer et al. | |
| 2014/0146689 A1* | 5/2014 | Gaur | H04J 11/0053 370/252 |
| 2015/0016408 A1* | 1/2015 | Yang | H04L 5/001 370/330 |

* cited by examiner

CHANNEL CONDITION ESTIMATION USING STATIC USER DATA SYMBOLS OVER USER EQUIPMENT (UE) SPECIFIC REFERENCE SIGNALS

TECHNICAL BACKGROUND

Data communication systems exchange user data to provide various services like media streaming, audio/video conferencing, data messaging, and internet access. The data communication systems use several communication protocols to transfer the user data. Exemplary communication protocols include Long Term Evolution (LTE), IEEE 802.3 (Ethernet), IEEE 802.11 (Wi-Fi), and Internet Protocol (IP). Within a given communication protocol, there may be multiple underlying communication protocols. For example, an LTE data packet using the LTE protocol uses underlying protocols like Media Access Control (MAC), Radio Link Control (RLC), and Packet Data Convergence Protocol (PDCP).

To improve efficiency, data communication systems perform data compression on user data. The data compression process removes redundant and unnecessary aspects of the user data and a reciprocal decompression process rebuilds the original data. Some forms of data compression transfer only changes to a data set instead of repeatedly transferring the complete and modified data set. For example, video compression technologies often transfer a complete image and then transfer modifications to the image instead of transferring the complete modified image. In another example, voice compressors drop silence data (white noise) and the voice decompressor automatically regenerates white noise at the receiver.

Orthogonal Frequency Division Multiplex (OFDM) is a popular communication network used to transfer data and signaling between wireless communication devices and base stations. In OFDM communication systems, reference signals are used to estimate channel quality. Reference signals may use pre-defined symbols known by both a wireless communication transmitter and a wireless communication receiver. Downlink reference signals are reference signals from a base station to a wireless communication device and may include Cell-specific Reference Signals (CRS), Channel State Information Reference Signals (CSI-RS), Demodulation Reference Signals (DM-RS), Multimedia-Broadcast Single-Frequency Network Reference Signals (MBSFN-RS), or Positioning Reference Signals (PRS). Uplink reference signals are reference signals from a wireless communication device to a base station and may include a Sounding Reference Signal (SRS) or a DM-RS.

Unfortunately, current use of reference signals results in more overhead on the air interface resource which increases overhead and significantly impacts overall network capacity and throughput. Therefore, reference signal technologies have not been properly optimized for data transmission efficiency.

TECHNICAL OVERVIEW

An Orthogonal Frequency Division Multiplex (OFDM) communication system has a wireless communication transmitter and a wireless communication receiver. The wireless communication transmitter converts the user data into static user data symbols and dynamic user data symbols. The wireless communication transmitter wirelessly transmits the dynamic user data symbols over user data resource elements and wirelessly transmits the static user data symbols over reference signal resource elements. The wireless communication receiver wirelessly receives the dynamic user data symbols over the user data resource elements and wirelessly receives the static user data symbols over the reference signal resource elements. The wireless communication receiver determines a wireless channel status condition based on the static user data symbols received over the reference signal resource elements. The wireless communication receiver generates a user data block including the user data from the dynamic user data symbols and the static user data symbols.

DETAILED DESCRIPTION

Figure 1:
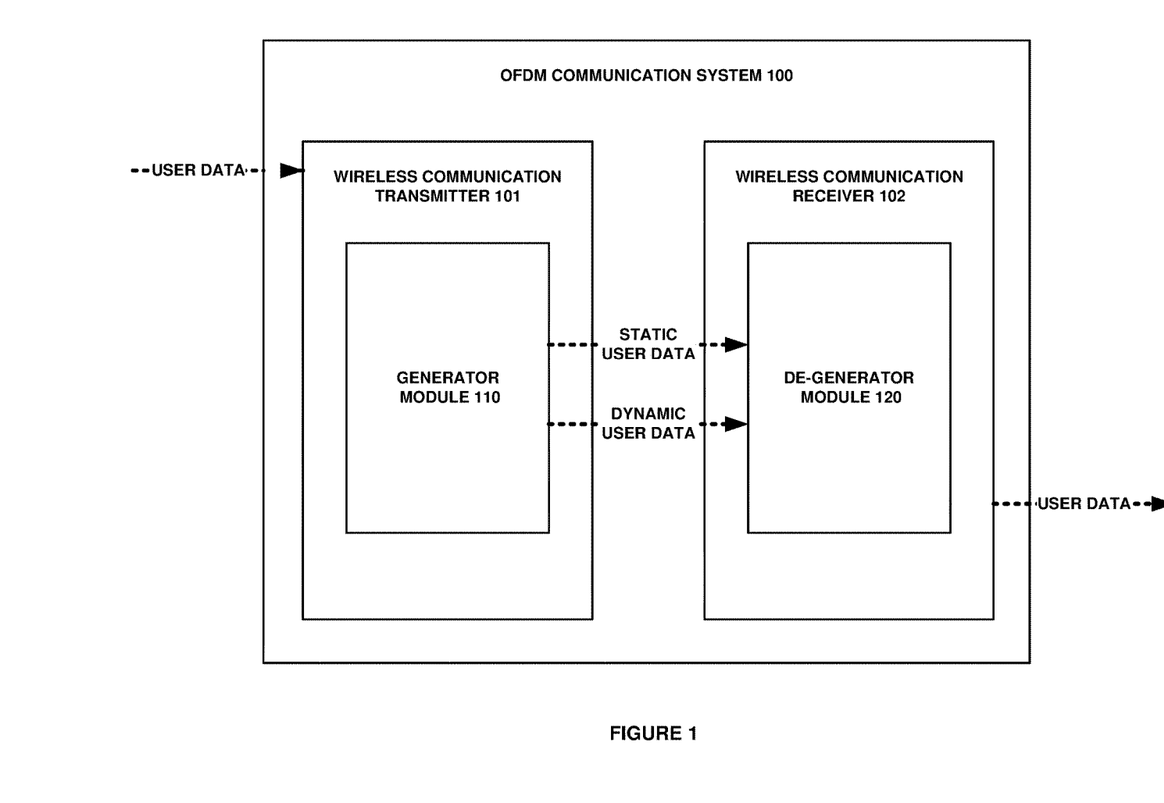
FIG. 1 illustrates an Orthogonal Frequency Division Multiplex (OFDM) communication system to determine a wireless channel status condition using static user data symbols over reference signal resource elements.

FIG. 1 illustrates OFDM communication system 100 to determine wireless channel status condition using static user data symbols over reference signal resource elements. OFDM communication system 100 comprises wireless communication transmitter 101 and wireless communication receiver 102 that reside in communication systems like phones, computers, base stations, gateways, servers, or some other intelligent machines with communication transceivers. For example, wireless communication transmitter 101 may reside in a wireless tablet computer and wireless communication receiver 102 may reside in a wireless base station.

Wireless communication transmitter 101 and wireless communication receiver 102 comprise Central Processing Units (CPUs), bus interfaces, memories, software, and communication transceivers. Wireless communication transmitter 101 includes generator module 110. Wireless communication receiver 102 includes de-generator module 120. Modules 110 and 120 comprise software that is stored on one or more computer readable storage media like flash drives, disc drives, or some other memory apparatus. When executed by data processing circuitry like wireless communication transmitter 101 and wireless communication receiver 102, this software directs the data processing circuitry to transmit and receive dynamic user data symbols and static user data symbols as described herein.

Wireless communication transmitter 101 and wireless communication receiver 102 use protocols to communicate over a physical link like air, metal, or glass. The physical link uses communication formats like Internet Protocol (IP), Long Term Evolution (LTE), IEEE 802.3 (Ethernet), and IEEE 802.11 (Wi-Fi). The communication protocols are often comprised of a series of sub-protocols, but for clarity, both the protocols and their sub-protocols are referred to herein as protocols. For example, the LTE protocol has individual protocols for: Physical media (PHY), Media Access Control (MAC), Radio Link Control (RLC), and Packet Data Convergence Protocol (PDCP).

In operation, wireless communication transmitter 101 converts the user data into static user data symbols and dynamic user data symbols. In a Protocol Data Unit (PDU), each user data symbol may be characterized as a static user data symbol or a dynamic user data symbol. Static user data symbols may be data that has been predefined as predictable between wireless communication transmitter 101 and wireless communication receiver 102. Static user data symbols may also be data that is constantly repeated in a specific bearer during transmission. For example, the user data in the static user data symbols may include MAC header data, MAC subheader data, and MAC payload data.

In some examples, the static user data symbols may comprise Protocol Data Unit (PDU) padding or other reserved bits that have been predefined as predictable between the sender and the receiver prior to data transmissions. PDU padding is typically used at the end of the PDU or before a PDU subheader when required. PDU padding typically does not contain data that is of value and is ignored by a receiver. In other examples, the user data in the static user data symbols may be a PDU Logical Channel Identifier (LCI) or Service Data Unit (SDU) Length Indicator (LI). The PDU LCI indicates whether the corresponding part of the MAC payload is a MAC Control Element or which logical channel the related MAC SDU belongs. The LI indicates the size of the related MAC SDU or MAC Control Element.

Dynamic user data symbols may be data that is categorized as data that has not been predetermined between wireless communication transmitter 101 and wireless communication receiver 102 or data that is not constantly repeated in a specific bearer during transmission. Wireless communication transmitter 101 may receive inputted user data and convert the user data into static user data symbols and dynamic user data symbols on the MAC layer using software modules, such as generator 110.

Wireless communication transmitter 101 wirelessly transmits the dynamic user data symbols over user data resource elements and wirelessly transmits the static user data symbols over reference signal resource elements. In OFDM communication system 100, resource elements are typically allocated a subcarrier slot and a symbol. Some resource elements may be allocated for user data while other resource elements may be allocated for reference signals. Reference signals are used to estimate channel quality and may use predefined modulation and coding scheme known by both wireless communication transmitter 101 and wireless communication receiver 102.

Wireless communication transmitter 101 may reorder the static user data symbols using the predefined modulation and coding scheme by scattering the static user data symbols within the PDU. The static user data symbols may be scattered in short resource element groups to enhance may increase reference signal determination by wireless communication receiver 102. It should also be noted that static user data symbols may be scattered using Frequency Division Duplexing (FDD), Time Division Duplexing (TDD), or both. Dynamic user data symbols and static user data symbols may be re-ordered on the MAC layer and transferred to the PHY layer for delivery to wireless communication receiver 102. Wireless communication transmitter 101 may transmit the dynamic user data symbols over user data resource elements and static user data symbols over reference signal resource elements on the PHY layer.

Wireless communication receiver 102 wirelessly receives the dynamic user data symbols over the user data resource elements and wirelessly receives the static user data symbols over the reference signal resource elements. Wireless communication receiver 102 may receive the dynamic user data symbols over user data resource elements and static user data symbols over reference signal resource elements on the PHY layer. Dynamic user data symbols and static user data symbols may be ordered on the MAC layer of wireless communication receiver 102 using software modules, such as degenerator 120. Advantageously, wireless communication receiver 102 is able to receive static user data symbols typically included in the PDU in the reference signal. This reduces the amount of resource elements used by traditional reference signals and therefore, reduces the overall resource signal overhead and increases network capacity throughput.

Wireless communication receiver 102 determines a wireless channel status condition based on the static user data symbols received over the reference signal resource elements. In some examples, the wireless channel status condition may be based on a Channel Quality Indicator (CQI). In other examples, the wireless channel status condition may be based on a Precoding Matrix Channel Indicator (PMI). In other examples, the wireless channel status condition may be based on a Rank Index (RI). In a final operation, wireless communication receiver 102 generates a user data block including the user data from the dynamic user data symbols and the static user data symbols.

In some examples, the reference signal resource elements comprise uplink Demodulation (D) reference signal elements. In other examples, the reference signal resource elements comprise downlink D reference signal elements. In some examples, the method of claim 1 wherein the OFDM communication system comprises a Long Term Evolution (LTE) communication system.

Figure 2:
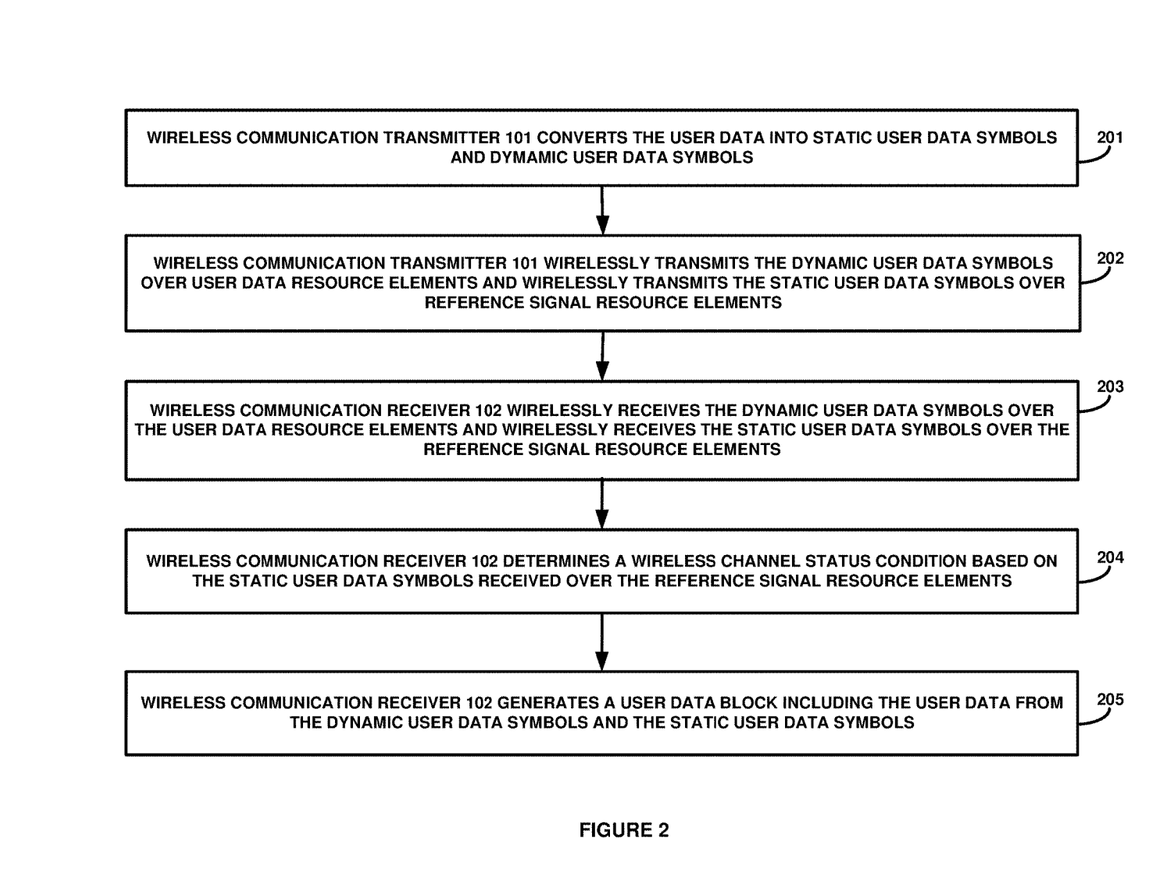
FIG. 2 illustrates the operation of the OFDM communication system to determine a wireless channel status condition using static user data symbols over reference signal resource elements.

FIG. 2 illustrates the operation of OFDM communication system 100 to determine a channel status condition using static user data symbols over reference signal resource elements. Wireless communication transmitter 101 converts (201) the user data into static user data symbols and dynamic user data symbols. Wireless communication transmitter 101 wirelessly transmits (202) the dynamic user data symbols over user data resource elements and wirelessly transmits (202) the static user data symbols over reference signal resource elements. Wireless communication receiver 102 wirelessly receives (203) the dynamic user data symbols over the user data resource elements and wirelessly receives (203) the static user data symbols over the reference signal resource elements. Wireless communication receiver 102 determines (204) a wireless channel status condition based on the static user data symbols received over the reference signal resource elements. Wireless communication receiver 102 generates (205) a user data block including the user data from the dynamic user data symbols and the static user data symbols.

Figure 3:
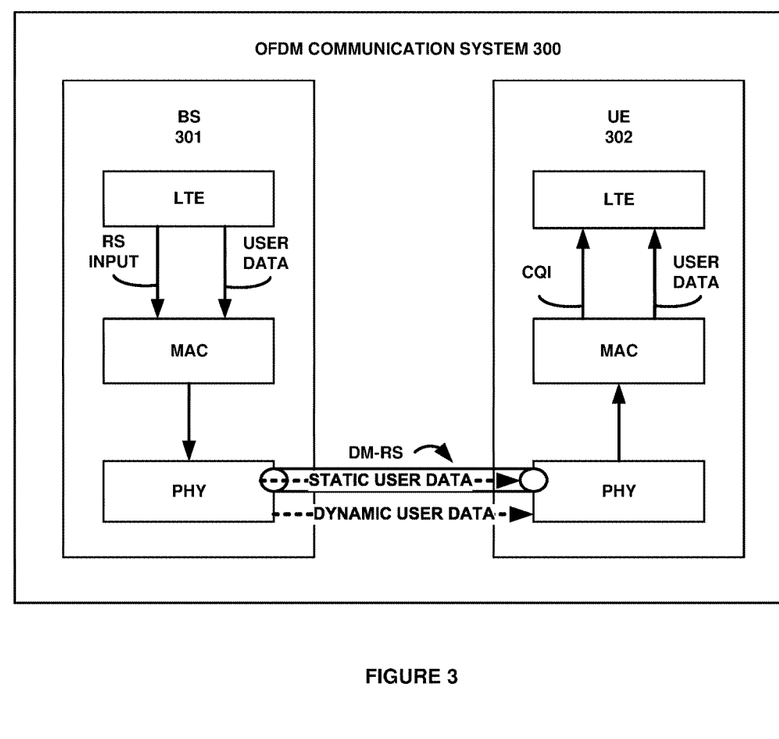
FIG. 3 illustrates an OFDM communication system to determine a wireless channel status condition using static user data symbols over reference signal resource elements.

FIG. 3 illustrates the OFDM communication system 300 to determine a channel status condition using static user data symbols over reference signal resource elements. OFDM data communication system 300 is an example of OFDM communication system 100, although OFDM communication system 100 may use alternative configurations and operations. OFDM communication system 300 comprises wireless base station 301 and User Equipment (UE) 302. Wireless base station 301 and UE 302 communicate over the air using LTE frames to transport IP data packets.

Wireless base station 301 may be a relay base station, a repeater base station, a macro base station, or some other wireless base station capable of transferring user data and a reference signal. Additional wireless base stations could be deployed between UE 302 and wireless base station 301 but are not shown for clarity. Although channel status condition could be determined from end-to-end through the network and beyond, the present example applies over the air between UE 302 and wireless base station 301. The UE 302 protocol stack comprises: PHY, MAC (for LTE), and LTE. The protocol stack for wireless base station 301 comprises: PHY, MAC (for LTE), and LTE.

In operation, wireless base station 301 receives user data from the LTE network on the LTE layer. Wireless base station 301 also receives a reference signal input which may be predetermined in advanced with UE 302. The LTE layer then transfers the user data to the MAC layer which converts the user data into static user data symbols and dynamic user data symbols. The MAC layer then generates the PDU by re-ordering the dynamic user data symbols into user data resource elements and the static user data symbols into reference signal resource elements. For example, the PDU LCI may be scattered into UE specific downlink D reference signal resource elements when generating a PDU. The re-ordered PDU is then transferred to the PHY layer to be transmitted to UE 301. Wireless base station 301 then wirelessly transmits the dynamic user data symbols over user data resource elements and wirelessly transmits the PDU LCI data symbols over the downlink D reference signal resource elements.

UE 302 then wirelessly receives the dynamic user data symbols over the user data resource elements and the PDU LCI data symbols over the downlink D reference signal resource elements on the PHY layer. The PHY layer then transfers the PDU to the MAC layer in UE 302 which then orders the user data symbols to determine a wireless channel status condition based on the PDU LCI data symbols received over the downlink D reference signal resource elements. In this example, UE 302 uses the PDI LCI data symbols received over the downlink D reference signal resource elements to determine a CQI. UE 302 also generates a user data block including the user data from the dynamic user data symbols and the static user data symbols. The CQI and the user data block are then transferred to the LTE layer.

Figure 4:
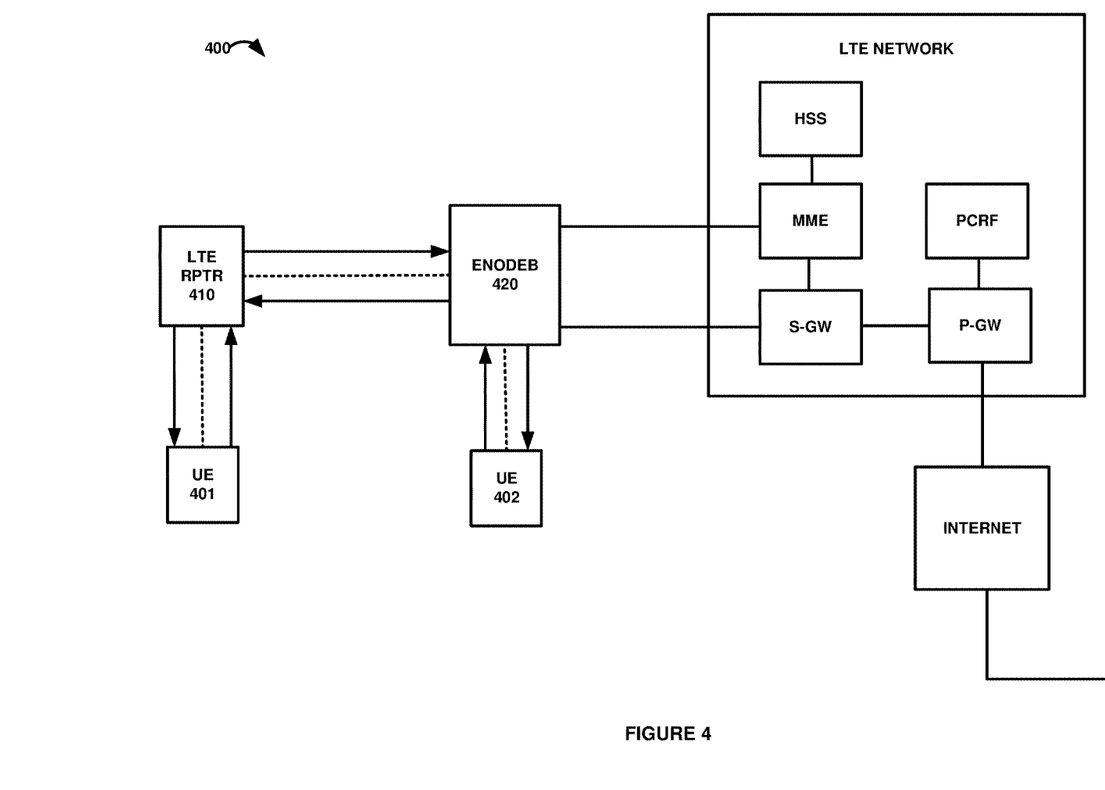
FIG. 4 illustrates a Long Term Evolution (LTE) communication system to determine wireless channel status condition using static user data symbols over reference signal resource elements.

FIG. 4 illustrates Long Term Evolution (LTE) communication system 400 to determine a channel status condition using static user data symbols over reference signal resource elements. LTE communication system 400 is an example of OFDM communication system 100, although OFDM communication system 100 may use alternative configurations and operations. LTE communication system 400 comprises UE 401, UE 402, LTE repeater 410, evolved NodeB (eNodeB) 420, an LTE network, and Internet. The LTE network comprises a Mobility Management Entity (MME), Home Subscriber Subsystem (HSS), a Serving Gateway (S-GW), a Packet Data Network Gateway (P-GW), and a Policy and Charging Rules Function (PCRF). As indicated by the arrows, UE 401 and UE 402 communicate over the LTE repeater and the eNodeB.

In operation, UE 401 receives user data from a user interface and receives a reference signal input which may be predetermined in advanced with LTE repeater 410. UE 401 then converts the user data into static user data symbols and dynamic user data symbols. UE 401 also generates the PDU by re-ordering the dynamic user data symbols into user data resource elements and the static user data symbols into reference signal resource elements. For example, the PDU padding may be scattered into uplink D reference signal resource elements when generating a PDU. UE 401 then wirelessly transmits the reordered PDU including dynamic user data symbols over user data resource elements and the PDU padding data symbols over the uplink D reference signal resource elements.

LTE repeater 410 then wirelessly receives the dynamic user data symbols over the user data resource elements and the PDU padding data symbols over the uplink D reference signal resource elements and orders the user data symbols to determine a wireless channel status condition based on the PDU padding data symbols received over the uplink D reference signal resource elements. In this example, LTE repeater 410 uses the PDI padding data symbols received over the uplink D reference signal resource elements to determine a PMI. LTE repeater 410 also generates a user data block including the user data from the dynamic user data symbols and the static user data symbols. The PMI and the user data block are then transferred to eNodeB 420 for delivery to UE 402.

In a next operation, eNodeB 420 receives the user data block from LTE repeater 410. eNodeB 420 may also receive a reference signal input which may be predetermined in advanced with UE 402. eNodeB then converts the user data into static user data symbols and dynamic user data symbols. eNodeB 420 also generates the PDU by re-ordering the dynamic user data symbols into user data resource elements and the static user data symbols into reference signal resource elements. For example, the SDU LI may be scattered into downlink D reference signal resource elements when generating a PDU. eNodeB 420 then wirelessly transmits the reordered PDU including dynamic user data symbols over user data resource elements and the SDU LI data symbols over the downlink D reference signal resource elements.

UE 420 then wirelessly receives the dynamic user data symbols over the user data resource elements and the SDU LI data symbols over the downlink D reference signal resource elements and orders the user data symbols to determine a wireless channel status condition based on the SDU LI data symbols received over the downlink D reference signal resource elements. In this example, UE 402 uses the SDU LI data symbols received over the downlink D reference signal resource elements to determine a RI. UE 402 also generates a user data block including the user data from the dynamic user data symbols and the static user data symbols.

Figure 5:
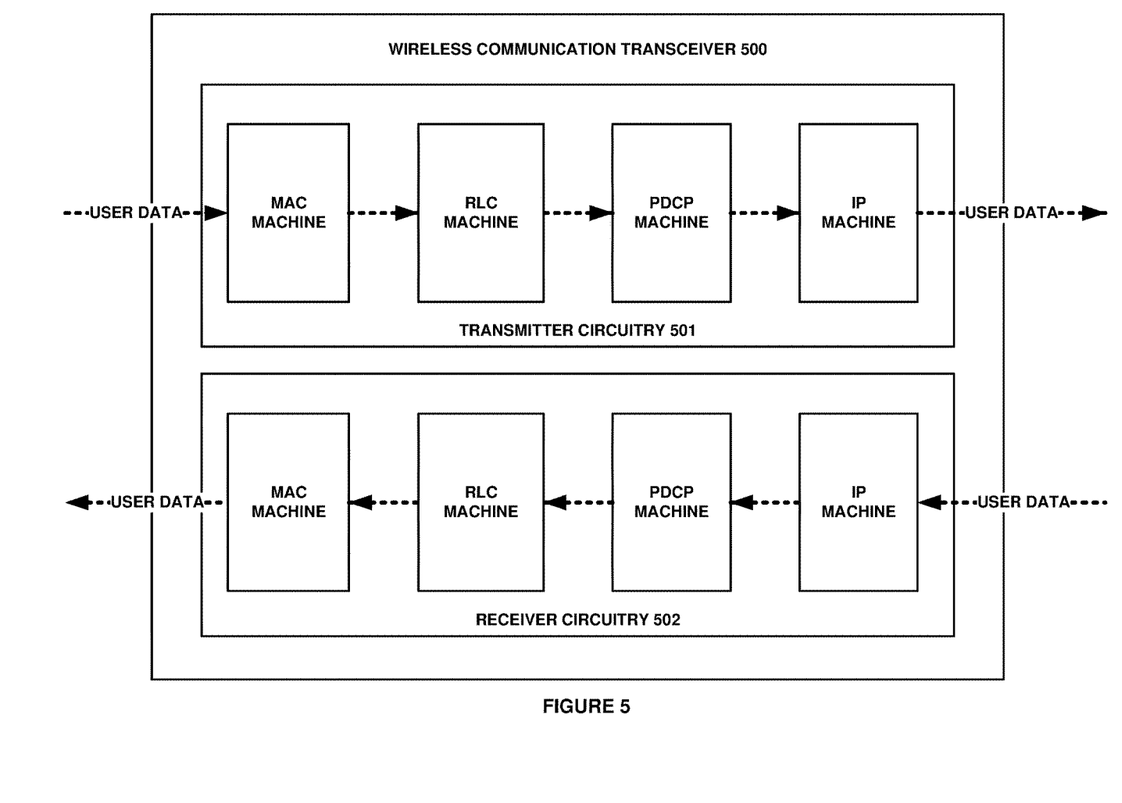
FIG. 5 illustrates a wireless communication transmitter to determine a wireless channel status condition using static user data symbols over reference signal resource elements.

FIG. 5 illustrates wireless communication transmitter 500 to using static user data symbols over reference signal resource elements. Wireless communication transmitter 500 is an example of wireless communication transmitter 101, wireless base station 301, UE 401, and eNodeB 420, although wireless communication transmitter 101, wireless base station 301, UE 401, and eNodeB 420 may use alternative configurations and operations. Wireless communication transmitter 500 may comprise a UE or a wireless access point. Wireless communication transmitter 500 comprises wireless communication transmitter circuitry 501 and wireless communication receiver circuitry 502. Wireless communication circuitry 501 and wireless communication receiver circuitry 502 each comprise a MAC machine, RLC machine, PDCP machine, and IP machine. The MAC, RLC, PDCP, and IP machines re-order/order and transmit/receive dynamic user data symbols over user data resource elements and static user data symbols over reference signal resource elements as described above.

Wireless communication transmitter 500 includes communication components, such as antennas, ports, amplifiers, filters, modulators/demodulators, signal processors, and the like. Wireless communication transmitter 500 comprise also includes microprocessors and other circuitry that retrieves and executes software from memory devices. Wireless communication transmitter 500 may also include a receive buffer, transmit buffer, CPU, and memory (not shown). The memory stores various software modules for the CPU, such as an OS. The CPU retrieves and executes software. The OS uses the protocol layers to process data packets to re-order/order and transmit/receive dynamic user data symbols over user data resource elements and static user data symbols over reference signal resource elements.

Where wireless communication transmitter 500 comprises a UE, wireless communication transmitter 500 may further include a user interface. Where wireless communication transmitter 500 comprises a wireless access point, wireless communication transmitter may further include a network interface. Wireless communication transmitter 500 may use TDD, IP, Ethernet, Synchronous Optical Networking (SONET), Wavelength Division Multiplexing (WDM) communication signaling, wireless communications, or some other communication format—including improvements thereof. Wireless communication transmitter 500 may use direct links, or intermediate networks, systems, or devices, and can include a logical network link transported over multiple physical links.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an Orthogonal Frequency Division Multiplex (OFDM) communication system comprising:
    a wireless communication transmitter converting the user data into static user data and dynamic user data, wherein the static user data comprises at least one of a data unit channel identifier and a data length indicator;
    the wireless communication transmitter wirelessly transmitting the dynamic user data over user data resource elements and wirelessly transmitting the static user data over reference signal resource elements, wherein the reference signal resource elements comprise downlink demodulation reference signal elements or uplink demodulation reference signal elements;
    a wireless communication receiver wirelessly receiving the dynamic user data over the user data resource elements and wirelessly receiving the static user data over the reference signal resource elements;
    the wireless communication receiver determining a Channel Quality Indicator (CQI) based on the static user data received over the reference signal resource elements; and
    the wireless communication receiver generating a user data block including the user data from the dynamic user data and the static user data.

2. The method of claim 1 further comprising the wireless communication receiver determining a Precoding Matrix Channel Indicator (PMI) based on the static user data received over the reference signal resource elements wherein the wireless.

3. The method of claim 1 further comprising the wireless communication receiver determining a Rank Index (RI) based on the static user data received over the reference signal resource elements.

4. The method of claim 1 wherein the data unit channel identifier comprises a Protocol Data Unit (PDU) Logical Channel Identifier (LCI).

5. The method of claim 1 wherein the data length indicator comprises a Service Data Unit (SDU) Length Indicator (LI).

6. The method of claim 1 wherein the user data in the static user data further comprises Protocol Data Unit (PDU) padding.

7. The method of claim 1 wherein the OFDM communication system comprises a Long Term Evolution (LTE) communication system.

8. An Orthogonal Frequency Division Multiplex (OFDM) communication system comprising:
    a wireless communication transmitter configured to convert the user data into static user data and dynamic user data, wherein the static user data comprises at least one of a data unit channel identifier and a data length indicator;
    the wireless communication transmitter configured to wirelessly transmit the dynamic user data over user data resource elements and wirelessly transmit the static user data over reference signal resource elements, wherein the reference signal resource elements comprise downlink demodulation reference signal elements or uplink demodulation reference signal elements;
    a wireless communication receiver configured to wirelessly receive the dynamic user data over the user data resource elements and wirelessly receive the static user data over the reference signal resource elements;
    the wireless communication receiver configured to determine a Channel Quality Indicator (CQI) based on the static user data received over the reference signal resource elements; and
    the wireless communication receiver configured to generate a user data block including the user data from the dynamic user data and from the static user data.

9. The OFDM communication system of claim 8 wherein the wireless communication receiver is further configured to determine a Precoding Matrix Channel Indicator (PMI) based on the static user data received over the reference signal resource elements.

10. The OFDM communication system of claim 8 wherein the wireless communication receiver is further configured to determine a Rank Index (RI) based on the static user data received over the reference signal resource elements.

11. The OFDM communication system of claim 8 wherein the data unit channel indicator comprises a Protocol Data Unit (PDU) Logical Channel Identifier (LCI).

12. The OFDM communication system of claim 8 wherein the data length indicator comprises a Service Data Unit (SDU) Length Indicator (LI).

13. The OFDM communication system of claim 8 wherein the user data in the static user data further comprises Protocol Data Unit (PDU) padding.

14. The OFDM communication system of claim 8 wherein the OFDM communication system comprises a Long Term Evolution (LTE) communication system.

* * * * *